United States Patent
Yamura

[15] 3,680,512
[45] Aug. 1, 1972

[54] METHOD OF BUILDING SHIPS
[72] Inventor: Ietoshi Yamura, Tokyo, Japan
[73] Assignee: Mitsui Shipbuilding and Engineering Co. Ltd., Tokyo, Japan
[22] Filed: June 2, 1970
[21] Appl. No.: 42,797

[30] Foreign Application Priority Data
Aug. 30, 1969 Japan..........................44/68808

[52] U.S. Cl. .................................114/46, 114/77 R
[51] Int. Cl. ..............................................B63b 3/02
[58] Field of Search...............................114/46, 77 R

[56] References Cited
UNITED STATES PATENTS
2,705,933   4/1965   Quirin.............................114/46

FOREIGN PATENTS OR APPLICATIONS
97,144   11/1947   Norway........................114/65 R Primary Examiner—Milton Buchler
Assistant Examiner—Gregory W. O'Connor
Attorney—Howson and Howson

[57] ABSTRACT

A method of building ships in which prefabricated sections of the hull are joined together, starting at the stern and working toward the bow. Each prefabricated section is deposited on a pontoon and is floated into position adjoining the already assembled sections and the supporting pontoon is coupled to the pontoon of the previously assembled section. The assembly takes place alongside a dock which may have a crane for completing the stern section as the assembly of the hull continues forwardly. After assembly of the hull, it may be launched by sinking the pontoons either at the dock or at a remote location, floating the hull away and refloating the pontoons and disconnecting them for reuse.

4 Claims, 2 Drawing Figures

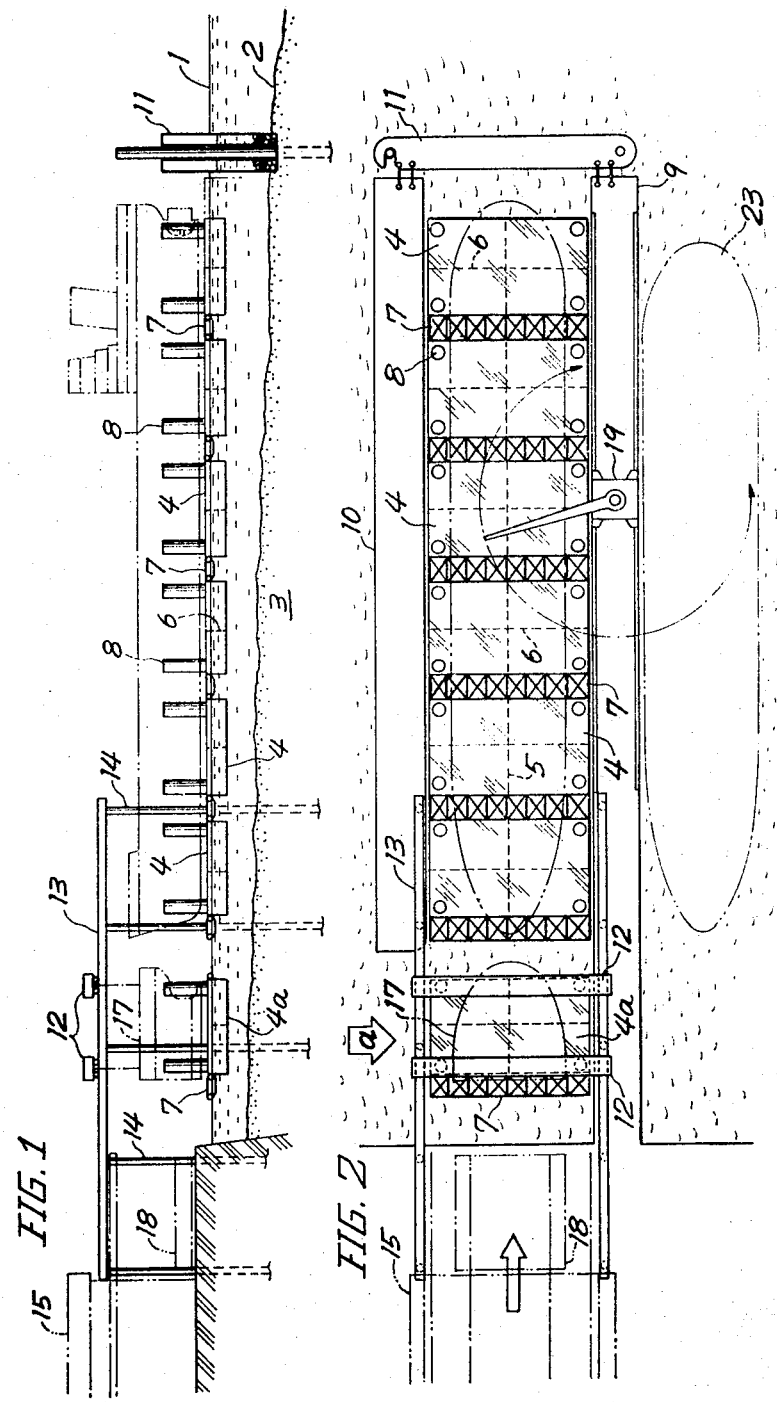

METHOD OF BUILDING SHIPS

The present invention relates to a method of building ships.

A building slip or a dry dock has been used for the building or large-size ships, which must have the bearing power of soil enough to bear the weight of a ship in addition to the weight of water loaded in a cargo hold of the ship for hydraulic test. Moreover a traveling crane of large capacity is required for assembling blocks to form the hull by carrying them to any position over the building slip or the dry dock. Furthermore in the building slip launching installation such as a launching way and launching work are required, while in the dry dock depth of water must be such as to permit a ship built on blocks to float easily on the water kept in the dock and lead it therefrom, and a gate easy to open and close must be provided. Thus, it takes a long period of time to construct such installation and cost of construction is very high.

Accordingly an object of this invention is to provide a novel method of ship shipbuilding which need not to provide a building slip and dry dock.

A method of shipbuilding of this invention comprises arranging a plurality of pontoons having sufficient buoyancy and strength, making centralized control of the quantity of water to be supplied to and drained from watertight subdivisions of the pontoons so that the upper surface of the pontoons may be kept on the same level of water, carrying blocks to form a hull on the pontoons and proceeding shipbuilding.

In the drawings,

FIG. 1 is a side view showing roughly one example of a method of shipbuilding in accordance with this invention; and FIG. 2 is a plan view of the same.

Referring now to the drawings, one example of a method of building a ship in accordance with this invention will be described. In the drawing, numeral 1 represents the surface of water, 2 is the bottom, 3 is soil, and 4 is pontoon having watertight lengthwise and crosswise partitions 5 and 6 therein. Each pontoon can be joined by a joining member 7 in such a manner as to be able to move up and down only. 8 represents a vertical tank for stabilizing the floating of the pontoon under the water, 9 represents a pier of rigid structure serving also as a breakwater, and a breakwater 10 is provided in parallel with the pier 9 with a distance in which the pontoons can be put, said pier 9 and breakwater 10 having walls formed of sheet piles to resist the crosswise movement of the pontoons. 11 represents a door or a floating body with scraps put on the lower side so as to be let to float again, which is sunk by pouring water therein at the end of a pontoon waterway, tied by ropes to the ends of the pier and the breakwater, and fixed to the bottom temporarily by driving piles through wells through the floating body, for preventing high waves owing to typhoons from coming inside. 12 represents a traveling crane of large capacity for lifting blocks to form a hull, which travels on crane girders 13 mounted on supports 14.

Each pontoon is provided with a pump for supplying and draining water and has watertight divisions inside, numbering at least four, before and behind and right and left, each of such divisions having pipes and valves for controlling the buoyancy and inclining of a pontoon by supplying or draining water from such divisions. The joining members 7 for pontoons are for keeping all the pontoons from dispersing and drifting when a ship has been launched by putting them under the water, being joined by hinges to the right and left sides of pontoons in such a manner as not to restrict the up and down movement or slanting of such pontoons and serving as a passage between the pontoons.

Construction of the hull starts from building a stern block. More particularly, individual blocks forming the stern block 17 are built in a plant 15, and first a ship's bottom is put on one pontoon 4a, on which by using the traveling crane 12 other blocks are placed one by one, and blocks of a superstructure deck and deck house are finally mounted. The blocks are welded to each other, and then the pontoon 4a is moved to the right of the water. Thereafter, under the crane girder the next pontoon is taken in the direction of an arrow a, on which a ship's bottom block 18 next to the stern block 17 is put, and the upper deck block is finally mounted. The second pontoon is joined by the joining member 7 to the first pontoon already moved right, and the upper surface of the both pontoons is brought to the same level by supplying or draining water from the watertight divisions therein. When the two pontoons have been brought to the same level, both hull blocks are joined and welded. This process is repeated in subsequent construction. Starting with the stern section, the building of the hull is carried on to the bow section under centralized control of water supplied to or drained from the watertight divisions in the pontoons for making their upper surface even on the water. Meanwhile construction of the stern section, which requires the longest period of work for engine and cabin fittings, is carried on by using the crane 19 able to travel on the pier 9. The building of hull sections is so scheduled and carried out as to be completed individually nearly at the same time.

The centralized control of the supply and drainage of water from watertight divisions in a number of pontoons is achieved by regulating the upper surface of each pontoon making that of the pontoon 4 a as a standard level. Automatic control also be made by interconnecting means for detecting the level and slanting of the upper surface of the pontoon to supply and drainage valves so that the valves may be operated in relation to the detecting signal. For launching the hull after completion of its building water is poured into the pontoons so as to let them sink untill the hull comes to float, and then the hull is taken from over the pontoons. In the case of the water at a place for building is shallow, the door 11 is released and the hull is towed offshore keeping it on the pontoons. The pontoons are sunk at a point of good depth of water. After launching a ship, pontoons are set afloat again, separated individually, and taken in under the crane girder one by one as the assembling of hull blocks of another ship goes on. The ship thus launched is moored to a fitting out basin, where preparatory work and remaining outfit work are done for sea trial. The ship may also be moored at the pier 9 as indicated by 23.

In accordance with this invention pontoons are easily moved with the block thereon, consequently the travelling distance of the crane for loading blocks can be shortened. Furthermore, it is possible to build a hull on the shallow water near a quay and tow the hull to the offshore where the water is deep enough to launch it by sinking pontoons. Thus, large size ships can be built with facilities for shipbuilding, which may be set up in a very short time and the cost is very low.

I claim:

1. A method of building ships using a plurality of individual pontoons comprising the steps of fabricating a plurality of hull blocks corresponding in number to the number of pontoons, each hull block being longer than the corresponding pontoon and consisting of a plurality of individual blocks, said individual blocks being built in a plant and thereafter placed one by one on the pontoon for said corresponding hull block, said hull block being fabricated on the pontoon by welding of said individual blocks together, supporting each hull block on its corresponding pontoon and floating said pontoon, displacing said floating pontoon to abut adjoining hull blocks, and regulating the buoyancy of each pontoon while it is floating by controlling the quantity of water in the pontoon so that the upper surfaces of the pontoons supporting the abutted hull sections are at a common level, permanently joining said abutted hull sections to complete the formation of the hull while said pontoons are in a floating condition, and launching the completed hull by sinking the plurality of pontoons supporting the same.

2. A method according to claim 1 wherein the stern hull block is fabricated first on a first pontoon, including the setp of anchoring said first pontoon against lateral displacement between a pier and a breakwater disposed parallel to each other and having a length longer than the length of the ship being built, wherein further said regulating step is effective to position the upper surface of each pontoon at a level with the upper surface of the stern block pontoon.

3. A method according to claim 2, including the step of connecting each pontoon to the adjacent pontoons by hinging the pontoons to a rigid joining member which permits displacement of the pontoons vertically relative to each other without substantial lateral movement.

4. A method according to claim 2, including the steps of equipping the stern blocks with engine and cabin fittings during the period when the subsequent hull blocks are fabricated on their corresponding pontoons.

* * * * *